United States Patent
Wielicki et al.

(10) Patent No.: US 10,715,501 B2
(45) Date of Patent: Jul. 14, 2020

(54) PROVIDING SECURE DATA TRANSMISSION OVER A UNIVERSAL SERIAL BUS (USB) INTERFACE

(71) Applicant: INTEL CORPORATION, Santa Clara, CA (US)

(72) Inventors: Rafal Wielicki, Gdansk (PL); Jaroslaw Stelter, Gdansk (PL); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 15/334,782

(22) Filed: Oct. 26, 2016

(65) Prior Publication Data
US 2018/0115533 A1   Apr. 26, 2018

(51) Int. Cl.
*H04L 29/06* (2006.01)
*G06F 13/42* (2006.01)

(52) U.S. Cl.
CPC ...... *H04L 63/0435* (2013.01); *G06F 13/4282* (2013.01); *H04L 63/061* (2013.01)

(58) Field of Classification Search
CPC ............... H04L 63/126; H04L 63/0853; H04L 63/0428; H04L 63/0435; H04L 9/3234
See application file for complete search history.

(56) References Cited

U.S. PATENT DOCUMENTS

| 2012/0192271 A1* | 7/2012 | Srivastava ............ G06F 21/554 726/22 |
| 2013/0179685 A1* | 7/2013 | Weinstein ............... G06F 21/85 713/168 |
| 2014/0019775 A1 | 1/2014 | Powell et al. |
| 2015/0350172 A1 | 12/2015 | Kiswani et al. |

FOREIGN PATENT DOCUMENTS

| EP | 1457859 A2 | 9/2004 |
| WO | 2012100079 A2 | 7/2012 |
| WO | 2016079371 A1 | 5/2016 |

OTHER PUBLICATIONS

PCT International Search Report, PCT Application No. PCT/US2017/052876, dated Jan. 11, 2018, 3 pages.

* cited by examiner

*Primary Examiner* — Dao Q Ho
(74) *Attorney, Agent, or Firm* — International IP Law Group, P.L.L.C.

(57) ABSTRACT

An example includes a computing device including a controller configured to communicably couple the computing device to a peripheral computing device. The controller includes an encryption unit configured to encrypt input data received from the peripheral computing device before sending the input data to an application running on the computing device, and a decryption unit configured to decrypt output data received from the application before sending the output data to the peripheral computing device. The computing device also includes a memory device including a data structure that directs the flow of the data between the peripheral computing device and the application. The data structure includes an encryption enable field and an encryption key field for controlling the encryption and decryption units of the controller.

17 Claims, 10 Drawing Sheets

PROVIDING SECURE DATA TRANSMISSION OVER A UNIVERSAL SERIAL BUS (USB) INTERFACE

BACKGROUND ART

Universal Serial Bus (USB) technology is widely utilized to facilitate high-speed communications between host computing devices and corresponding peripheral computing devices (i.e., USB devices). More specifically, USB technology allows a particular host computing device to send data to, and receive data from, a wide variety of USB devices by providing high-speed data channels between the host computing device and each USB device. The input and output data that are sent through these data channels often include user-sensitive, confidential information. For example, a fingerprint reader (USB device) may send user identification credentials (input data) to a computer (host computing device) to gain access to a particular secure application on the computer, such as a bank account application. The security of such input data is clearly of high importance, since the illegal or unauthorized use of such data could lead to identity theft or fraud, for example. However, despite the sensitivity of such data and the significant risk that such data will be stolen, such data are commonly transmitted through unsecure data channels. This exposes the data to various threats, such as spyware, malware, viruses, and the like.

Current solutions to this problem rely on the inclusion of specialized technology within each USB device. As a result, such solutions are typically only used in security-focused environments by those who are willing to spend extra money for high-end USB devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
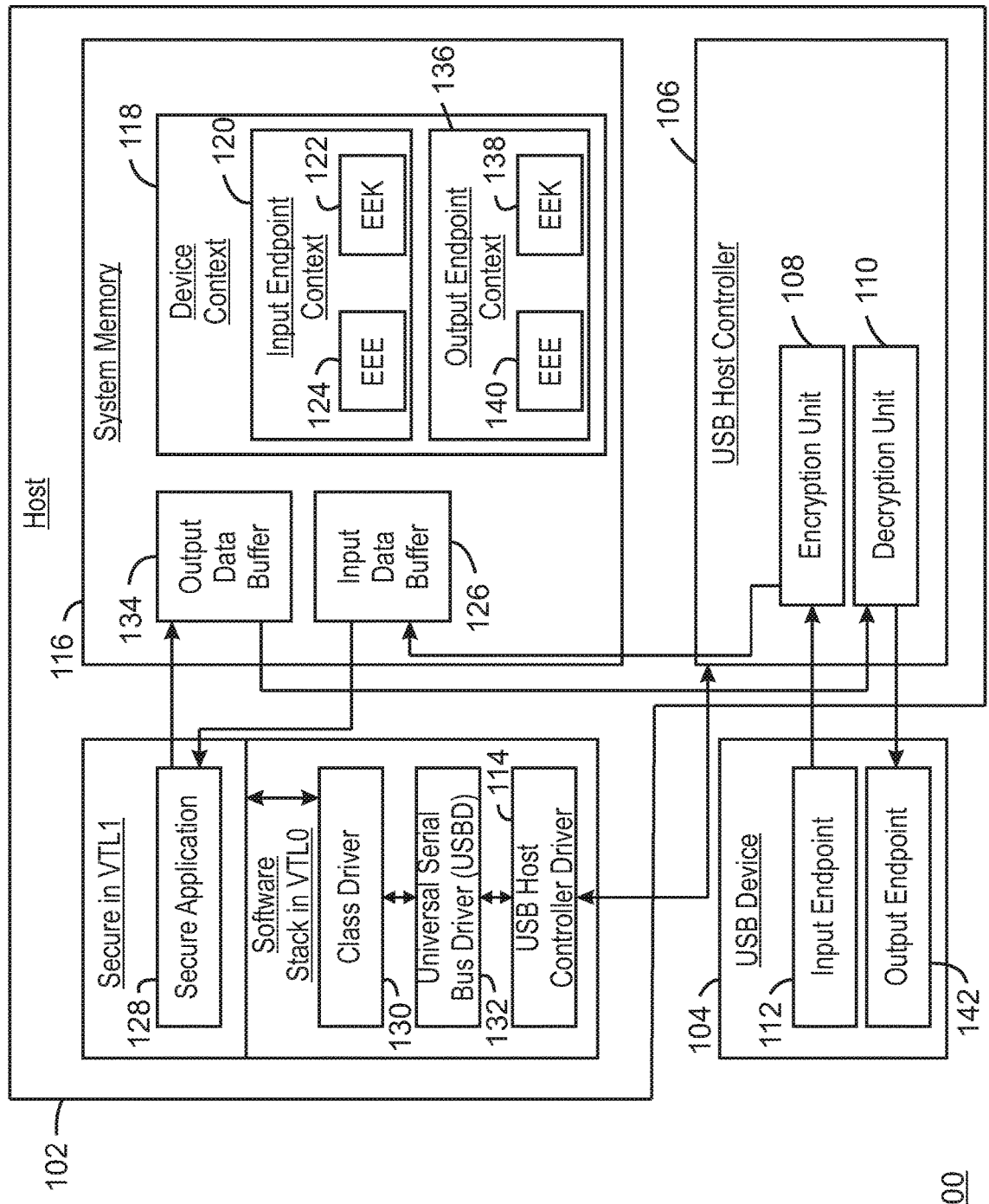
FIG. 1 is a block diagram of an example system that can provide secure data transmission over a Universal Serial Bus (USB) interface.

As discussed above, sensitive data are often transmitted between USB devices and host computing devices via unsecure data channels. This lack of data protection exposes such sensitive data to various threats, such as spyware, malware, and viruses. Moreover, most users are not even aware of this significant security risk.

Accordingly, embodiments described herein provide a system and method for providing secure data channels between such USB devices and host computing devices. Specifically, embodiments described herein provide an encrypted data channel between a USB host controller, such as an Extensible Host Controller Interface (xHCI) controller, and a secure application that corresponds to a particular USB device. This is accomplished by modifying the USB host controller that resides on the host computing device, without requiring any modifications to the USB device itself. This significantly differs from current solutions to this problem, which require hardware and/or firmware modifications to each USB device. Because the system and method described herein provide modifications to the USB host controller instead of modifications to particular USB devices, the system and method described herein can be used for various different types of USB devices and can be made part of the native USB stack in the host operating system. As a result, the system and method described herein provide a solution that is highly scalable, fast, and affordable as compared with current solutions.

The system and method described herein may be used in conjunction with standard human input devices (HIDs), such as keyboards, touchpads, and the like, and biometric authentication devices, such as web cameras, fingerprint readers, and the like. However, the system and method described herein may also be used in conjunction with any other type of USB device for which increased data security is desired.

According to current techniques, the USB host controller creates and maintains a data structure called "Device Context" for each detected USB device. The Device Context includes general information about the USB device, as well as configuration data for the USB device. The Device Context also includes a set of data structures referred to as "endpoints." Each endpoint facilitates communication between the USB device and the host computing device by returning a descriptor through a physical connection between the USB device and the host computing device. The descriptor defines the endpoint's configuration and expectations, including the source and destination for particular input or output data. Each endpoint generally corresponds to either input data or output data; and the endpoint data structures may be divided into two data structures called "Input Endpoint Context" and "Output Endpoint Context," both of which are maintained within the Device Context.

The host computing device uses the Input Endpoint Context and Output Endpoint Context to control the flow of data between the USB host controller and particular applications. According to current techniques, such data is unprotected as it flows between the USB host controller and the applications, rendering the data vulnerable to security attacks along this long communication path. Accordingly, embodiments described herein provide an improved USB host controller with encryption and decryption capabilities. This improved USB host controller can protect secure data by ensuring that it is encrypted as it travels between the USB host controller and the corresponding secure application. Moreover, the USB host controller's encryption capability may be controlled by adding two fields to the endpoint data structure. The first field, referred to as the "Endpoint Encryption Enable (EEE)" field, may be used to turn the USB host controller's encryption feature on or off for a particular endpoint. The second field, referred to as the "Endpoint Encryption Key (EEK)" field, may contain an encryption key to be used for data encryption or decryption, depending on the endpoint direction. The EEE field and EEK field are discussed further below with respect to FIG. 1.

FIG. 1 is a block diagram of an example system 100 that can provide secure data transmission over a USB interface. Specifically, the system 100 can provide a secure data channel between internal components of a host 102. The secure data channel may be used to protect data received from a USB device 104, or to protect data being sent to the USB device 104 from the host 102. The host 102 may be any type of computing device that is configured to communicate with USB devices. The USB device 104 may be any type of standard USB device, or may be a specialized USB device that is equipped with enhanced security features. In some examples, the host 102 is the computing device 600 described with respect to FIG. 6, and the USB device 104 is one of the USB devices 626 described with respect to FIG. 6.

As shown in FIG. 1, the host 102 may include a USB host controller 106. In some examples, the USB host controller 106 is defined by the Extensible Host Controller Interface (xHCI) specification. However, in other examples, the USB host controller may be defined by any other suitable specification, such as the Open Host Controller Interface (OHCI) specification, the Universal Host Controller Interface (UNCI) specification, or the Enhanced Host Controller Interface (EHCI) specification.

The USB host controller 106 may include an encryption unit 108 and a decryption unit 110. According to embodiments described herein, the encryption unit 108 may be configured to encrypt input data received from the USB device 104. Specifically, when the USB host controller 106 receives data from the USB device that corresponds to an input endpoint 112, a USB host controller driver 114 may search system memory 116 to discover specific information corresponding to the input data. In particular, the USB host controller driver 114 may search a Device Context data structure 118 to find an Input Endpoint Context data structure 120. The USB host controller driver 114 may then write an Endpoint Encryption Key (EEK) field 122 and an Endpoint Encryption Enable (EEE) field 124 of the Input Endpoint Context data structure 120. The EEK field may include a specific encryption key for encrypting the input data, and the EEE field may include information that enables the encryption unit 108 to encrypt the input data.

The USB host controller 106 may then determine whether the EEE field 124 is set within the Input Endpoint Context data structure 120. If the EEE field 124 is set, the USB host controller 106 may read the EEK field 122 to obtain the specific encryption key. The USB host controller 106 may then send the specific encryption key to the encryption unit 108, which may use the encryption key to encrypt the input data.

Once the input data has been encrypted, the USB host controller 106 may send the input data to an input data buffer 126, which may send the input data to its ultimate destination. In various examples, the ultimate destination of the input data is a secure application 128 running on the host 102. The secure application 128 may be familiar with the particular input data and may include information for decrypting the input data.

In some examples, the host 102 may run the secure application 128 in virtual trust level 1 (VTL1), as shown in FIG. 1. VTL1 is a special-purpose virtual machine with a higher trust level. This ensures that the secure data is protected from software running on the root partition, which is referred to as virtual trust level 0 (VTL0). In some examples, all software other than the secure application 128 may be run in VTL0, including the USB host controller driver 114, a class driver 130, and a Universal Serial Bus driver (USBD) 132, as shown in FIG. 1. In other examples, the host 102 may run other software, such as other secure applications, in additional virtual trust levels not shown in FIG. 1.

Referring back to the USB host controller 106, according to embodiments described herein, the decryption unit 110 may be configured to decrypt output data before sending the output data to the USB device 104. Specifically, the secure application 128 may send output data to an output data buffer 134, and the output data buffer 134 may then forward the output data to the USB host controller 106. The USB host controller driver 114 may then search the Device Context data structure 118 to find an Output Endpoint Context data structure 136. The USB host controller driver 114 may then write an Endpoint Encryption Key (EEK) field 138 and an Endpoint Encryption Enable (EEE) field 140 of the Output Endpoint Context data structure 136. The EEK field may include a specific encryption key for encrypting the output data, and the EEE field may include information that enables the decryption unit 110 to decrypt the output data.

The USB host controller 106 may then determine whether the EEE field 140 is set within the Output Endpoint Context data structure 136. If the EEE field 140 is set, the USB host controller 106 may read the EEK field 138 to obtain the specific encryption key. The USB host controller 106 may then send the specific encryption key to the decryption unit 110. The decryption unit 110 may use the encryption key to decrypt the output data before sending the data to the USB device 104 via a corresponding output endpoint 142.

According to embodiments described herein, the inclusion of the encryption unit 108 and the decryption unit 110 within the USB host controller 106 allows the host 102 to protect secure input/output (I/O) data as it flows between the USB host controller 106 and the secure application 128. Moreover, the expansion of the Input and Output Endpoint Context data structures 120 and 136 to include the EEE fields 122 and 138 and the EEK fields 124 and 140 allows the USB host controller driver 114 to efficiently control the encryption unit 108 and the decryption unit 110 of the USB host controller 106.

The block diagram of FIG. 1 is not intended to indicate that the system 100 is to include all of the components shown in FIG. 1. Rather, the system 100 can be implemented using any number of additional components not shown in FIG. 1. Moreover, any number of the components shown in FIG. 1 can be omitted from the system 100, depending on the specific implementation.

Figure 2:
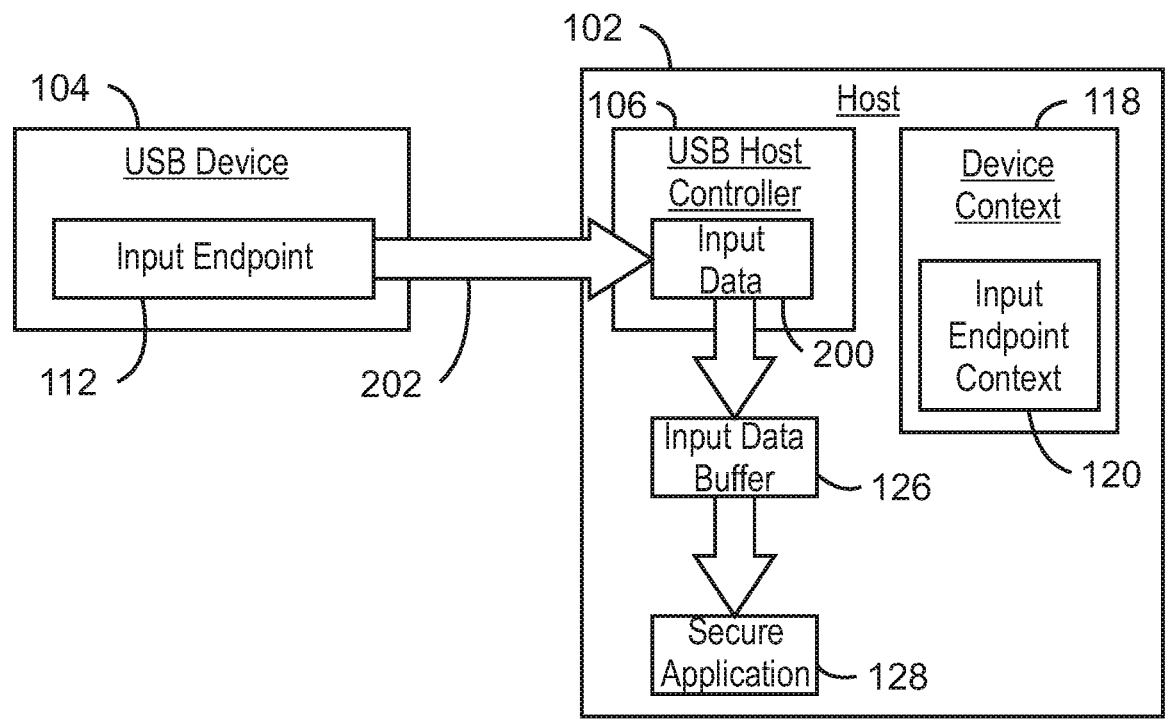
FIG. 2 is a simplified block diagram illustrating the operation of the system of FIG. 1 for transmitting USB input data in unsecure mode.

FIG. 2 is a simplified block diagram illustrating the operation of the system of FIG. 1 for transmitting USB input data in unsecure mode. As shown in FIG. 2, the USB device 104 may send input data 200 to the USB host controller 106 via a physical connection 202. The USB host controller 106 may then determine whether the input data 200 is to be transmitted in secure mode or unsecure mode. This may be accomplished by reading the Input Endpoint Context data structure 120 corresponding to the particular input endpoint 112. According to the example shown in FIG. 2, the input data 200 is to be transmitted in unsecure mode because the EEE field is not set for the particular input endpoint 112, indicating that the encryption feature of the USB host controller 106 is not enabled.

Because the encryption feature of the USB host controller 106 is not enabled for the particular input endpoint 112, the USB host controller may simply forward the input data 200 to the input data buffer 126. The input data buffer 126 may then send the input data 200 to the secure application 128.

Figure 3:
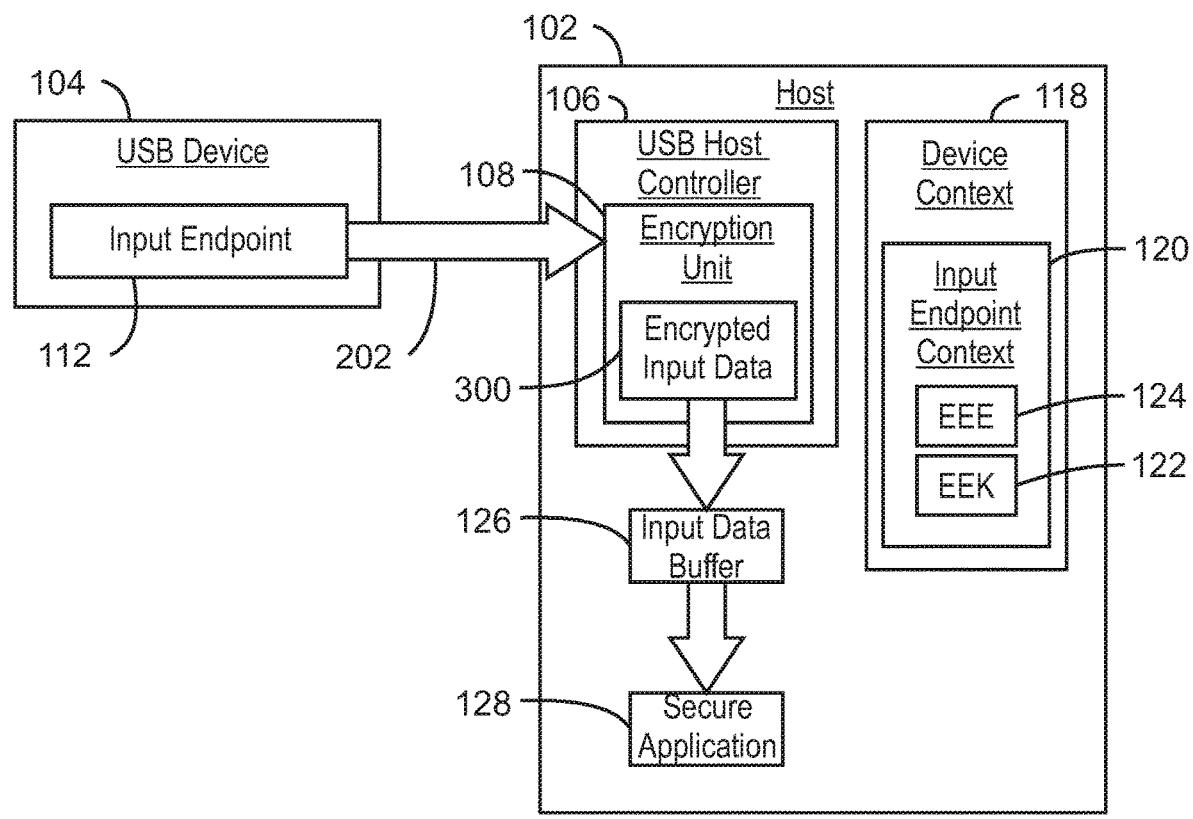
FIG. 3 is a simplified block diagram illustrating the operation of the system of FIG. 1 for transmitting USB input data in secure mode.

FIG. 3 is a simplified block diagram illustrating the operation of the system of FIG. 1 for transmitting USB input data in secure mode. The example shown in FIG. 3 differs from the example shown in FIG. 2 because the EEE field 122 and the EEK field 124 are set for the particular input endpoint 112, indicating that the encryption feature of the USB host controller 106 is enabled. Therefore, the encryption unit 108 of the USB host controller 106 may encrypt the input data using the encryption key. The USB host controller 106 may then send the resulting encrypted input data 300 to the input data buffer 126. The input data buffer 126 may then send the encrypted input data 300 to the secure application 128, which may be capable of decrypting the input data and using the data for its intended purpose.

Figure 4:
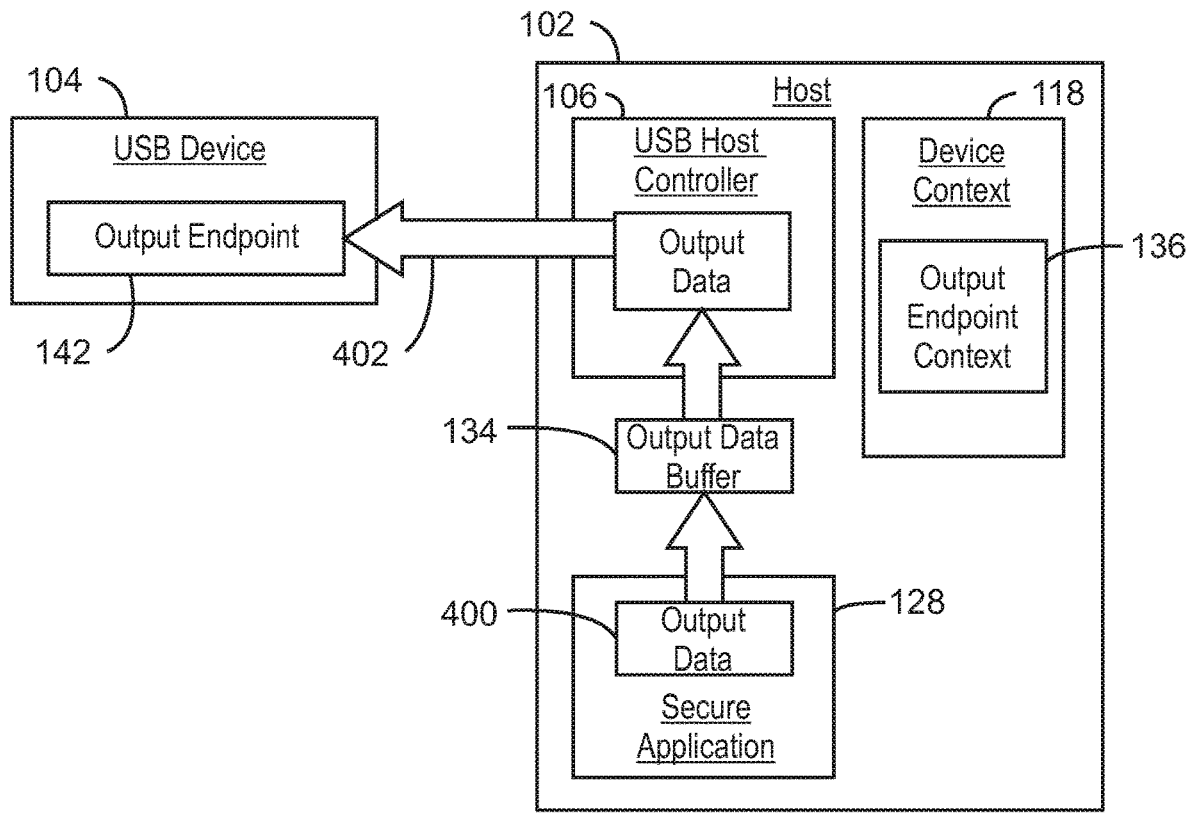
FIG. 4 is a simplified block diagram illustrating the operation of the system of FIG. 1 for transmitting USB output data in unsecure mode.

FIG. 4 is a simplified block diagram illustrating the operation of the system of FIG. 1 for transmitting USB output data in unsecure mode. As shown in FIG. 4, the secure application 128 may send output data 400 to the output data buffer 134, and the output data buffer 134 may send the output data 400 to the USB host controller 106. The USB host controller 106 may then determine whether the output data 400 is encrypted. This may be accomplished by reading the Output Endpoint Context data structure 136 corresponding to the particular output endpoint 142. According to the example shown in FIG. 4, the output data 400 is not encrypted because the EEE field is not set for the particular output endpoint 142, indicating that the encryption feature of the USB host controller 106 is not enabled. Because the encryption feature of the USB host controller 106 is not enabled for the particular output endpoint 142, the USB host controller may simply transmit the output data 400 to the USB device 104 via a physical connection 402.

Figure 5:
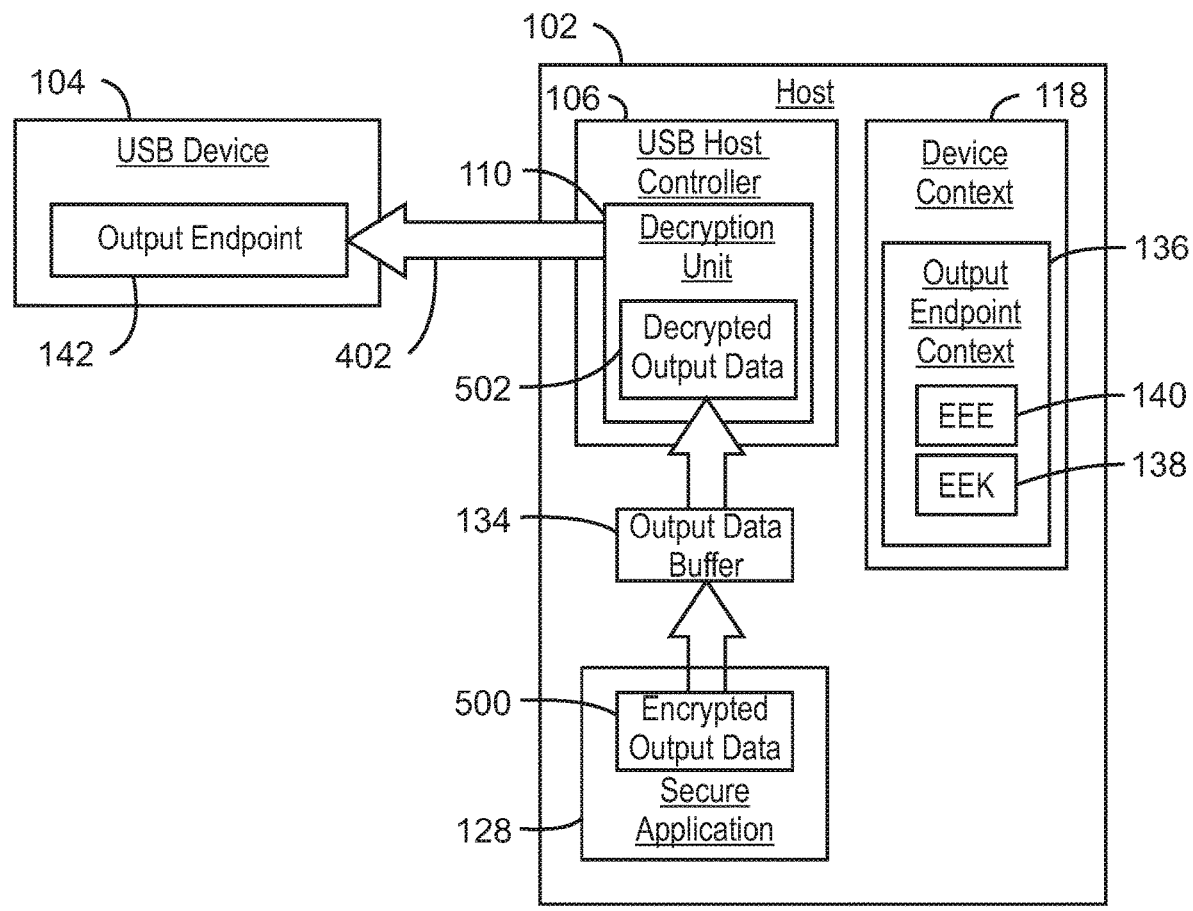
FIG. 5 is a simplified block diagram illustrating the operation of the system of FIG. 1 for transmitting USB output data in secure mode.

FIG. 5 is a simplified block diagram illustrating the operation of the system of FIG. 1 for transmitting USB output data in secure mode. FIG. 5 differs from FIG. 4 in that the EEE field 138 and EEK field 140 are set for the particular output endpoint 142. This indicates that the data being sent from the secure application 128 is encrypted output data 500. Therefore, the decryption unit 110 of the USB host controller 106 may use the encryption key to produce decrypted output data 502 before sending the output data 502 to the USB device 104 via the physical connection 402. In this manner, the output data 502 remains encrypted as it travels between the secure application 128 and the USB host controller 106, but the USB device 104 itself receives only the decrypted output data 502 and is unaffected by the enhanced security features of the USB host controller 106.

Figure 6:
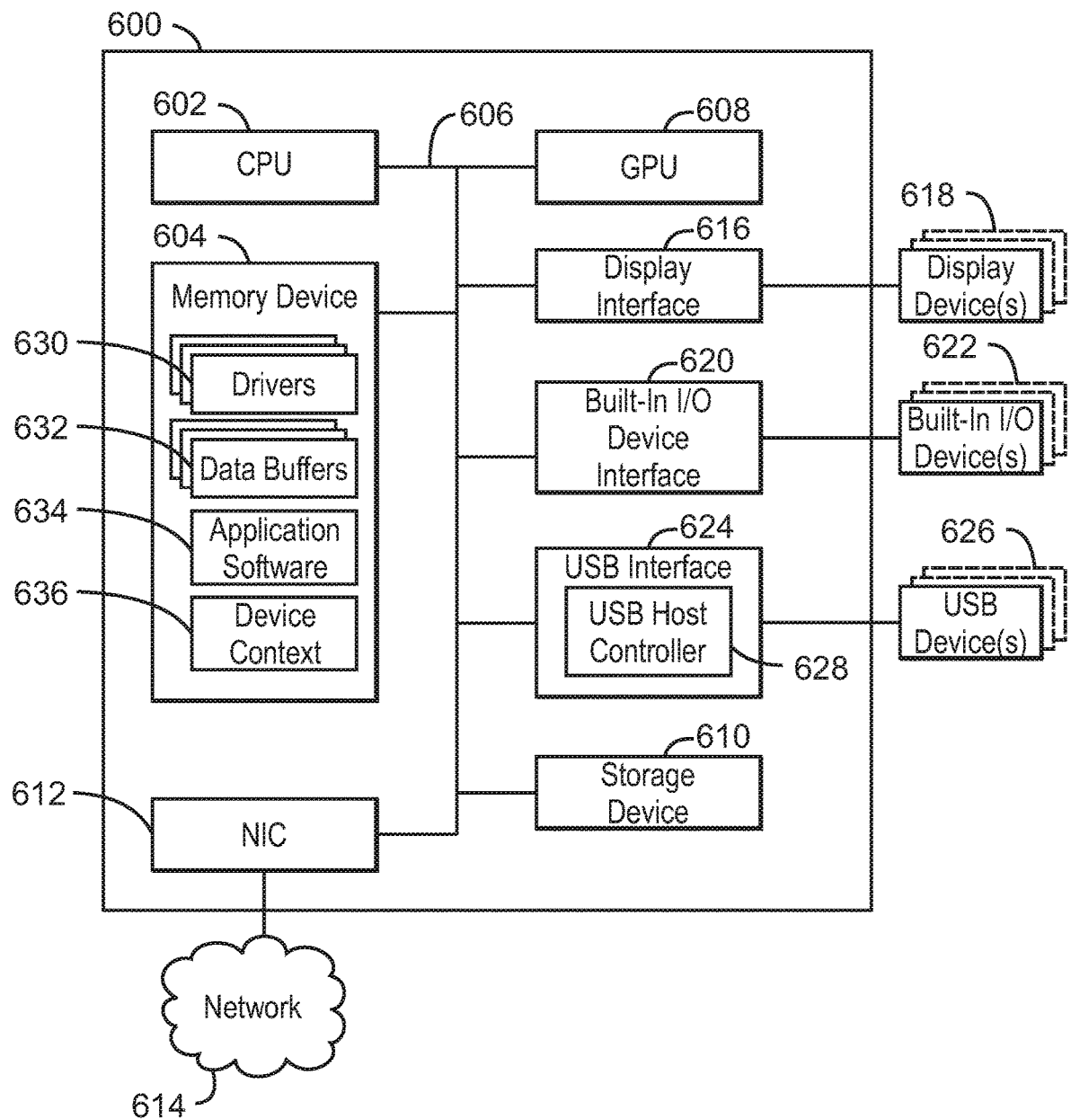
FIG. 6 is a block diagram of a computing device that can provide secure data transmission over a USB interface.

FIG. 6 is a block diagram of a computing device 600 that can provide secure data transmission over a USB interface. The computing device 600 may be any type of computing device that is configured to communicate with USB devices. For example, the computing device 600 may be a laptop computer, desktop computer, Ultrabook, tablet computer, server, Internet of Things (IoT) appliance, or smart phone. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606.

The CPU 602 may be a single core processor, a multi-core processor, a computing cluster, or any number of other configurations. Moreover, the computing device 600 may include more than one CPU 602. The memory device 604 may include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The computing device 600 may include a storage device 610. The storage device 610 may be a physical memory device, such as a hard drive, an optical drive, a thumbdrive, an array of drives, or any combinations thereof. The storage device 610 may also include remote storage drives.

The computing device 600 may also include a network interface controller (NIC) 612. The NIC 612 may be configured to connect the computing device 600 through the bus 606 to a network 614. The network 614 may be a wide area network (WAN), local area network (LAN), or the Internet, among others. In some examples, the computing device 600 may communicate with other computing devices through a wireless technology. For example, the computing device 600 may communicate with other computing devices via a wireless local area network connection. In some examples, the computing device 600 may connect and communicate with other computing devices via Bluetooth® or similar technology.

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600. Moreover, in some examples, the display interface 616 may connect the computing device 600 to a number of different display devices 618, as shown in FIG. 6.

The CPU 602 may also be connected through the bus 606 to a built-in input/output (I/O) device interface 620 configured to connect the computing device 600 to any number of built-in I/O devices 622. The built-in I/O devices 622 may include, for example, a keyboard and a pointing device, such as a touchpad or touchscreen, among others.

The CPU 602 may also be linked through the bus 606 to a USB interface 624 configured to connect the computing device 600 to any number of USB devices 626. The USB devices 626 may include, for example, USB 2.0 devices, USB 3.1 devices, or the like. In some examples, the USB devices 626 may include Human Input Devices (HIDs), such as external keyboards or touchpads. In addition, in some examples, the USB devices 626 may include biometric authentication devices, such as web cameras and fingerprint readers. The USB devices 626 may also include a wide array of other devices, such as flash drives, digital cameras, media players, printers, or the like.

The USB interface 624 may include a USB host controller 628 that is configured to control the transfer of data to and from the USB devices 626. According to embodiments described herein, the USB host controller 628 may include an encryption unit and a decryption unit for providing secure data channels between the USB host controller 628 and one or more secure applications. Furthermore, according to embodiments described herein, the memory device 604 may include one or more drivers 630, one or more data buffers 632, application software 634, and a Device Context data structure 636. These memory components may be utilized by the computing device 600 to provide the secure data channels between the USB host controller 628 and the secure applications, as described further above with respect to FIGS. 1-5.

The block diagram of FIG. 6 is not intended to indicate that the computing device 600 is to include all of the components shown in FIG. 6. Rather, any number of the components shown in FIG. 6 can be omitted from the computing device 600. Moreover, the computing device 600 can include any number of additional components not shown in FIG. 6, depending on the details of the specific implementation.

Figure 7:
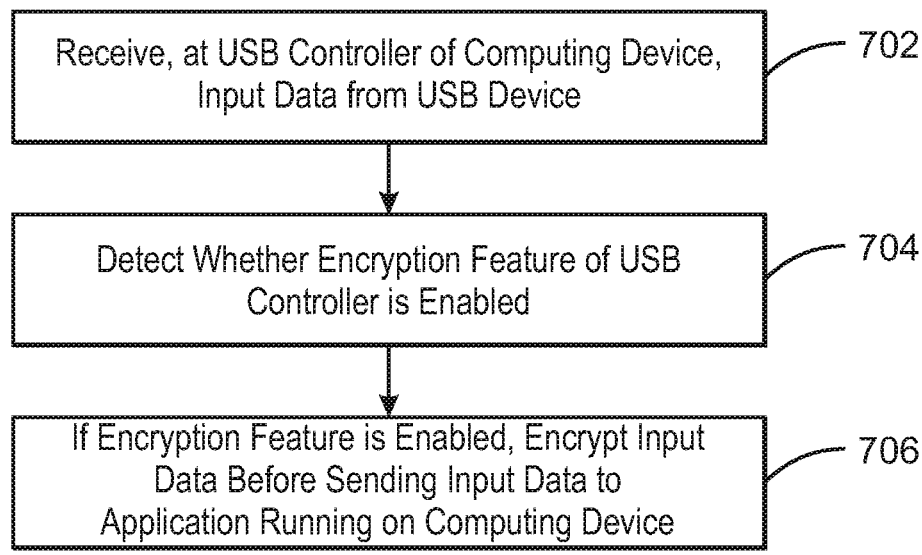
FIG. 7 is a process flow diagram of a method for securely transmitting USB input data.

FIG. 7 is a process flow diagram of a method 700 for securely transmitting USB input data. The method 700 can be implemented by the computing device 600 of FIG. 6, as described above. In addition, the method 700 can be implemented using the example system 100 described above with respect to FIGS. 1-5.

The method 700 begins at block 702, at which a USB controller of the computing device receives input data from a USB device. The USB device may be a standard USB device, or may be a USB device with built-in encryption capabilities, depending on the details of the specific implementation.

At block 704, the USB controller may detect whether its encryption feature is enabled. This may be accomplished by accessing a portion of a data structure corresponding to an input endpoint for the input data. The USB controller may then determine whether an encryption enable field of the portion of the data structure is set for the input data.

At block 706, if the encryption feature of the USB controller is enabled, the USB controller may encrypt the input data before sending the input data to an application running on the computing device. More specifically, if the encryption enable field is set for the input data, the USB controller may read an encryption key field of the portion of the data structure to determine an encryption key corresponding to the input data. The USB controller may then use the encryption key to encrypt the input data at an encryption unit of the USB controller.

This process flow diagram of FIG. 7 is not intended to indicate that the blocks of the method 700 are to be executed in any particular order, or that all of the blocks are to be included in every case. Further, any number of additional blocks not shown in FIG. 7 may be included within the method 700, depending on the details of the specific implementation. For example, the USB controller may send the input data directly to the application without encrypting the input data if an encryption feature of the USB controller is not enabled. In addition, in some examples, the method 700 may be performed for input data received from a number of different USB devices, and such input data may be sent to a number of different applications.

Figure 8:
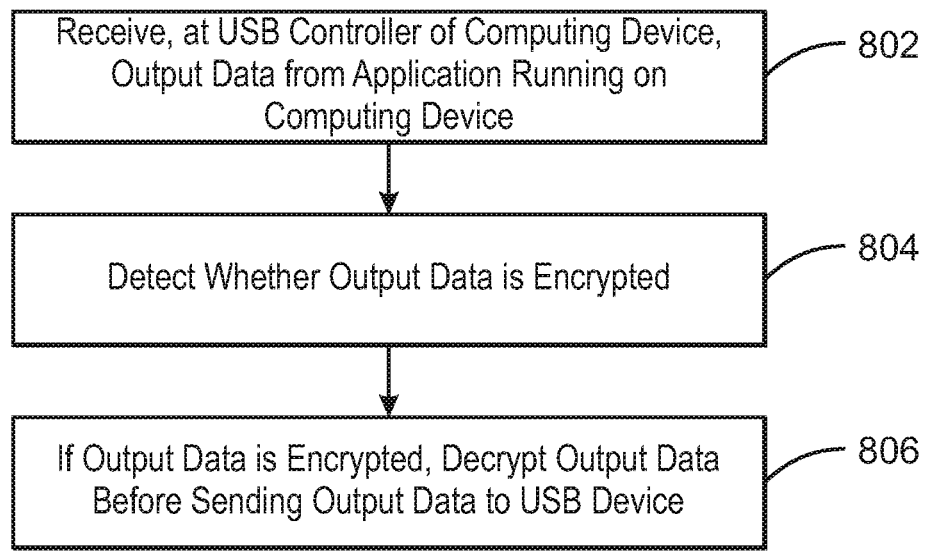
FIG. 8 is a process flow diagram of a method for securely transmitting USB output data.

FIG. 8 is a process flow diagram of a method 800 for securely transmitting USB output data. The method 800 can be implemented by the computing device 600 of FIG. 6, as described above. In addition, the method 800 can be implemented using the example system 100 described above with respect to FIGS. 1-5.

The method 800 begins at block 802, at which a USB controller of the computing device receives output data from an application running on the computing device. The method 800 then continues to block 804, at which the USB controller detects whether the output data is encrypted. This may be accomplished by accessing a portion of a data structure corresponding to an output endpoint for the output data. The USB controller may then determine whether an encryption enable field of the portion of the data structure is set for the output data.

At block 806, if the output data is encrypted, the USB controller may decrypt the output data before sending the output data to a USB device. More specifically, if the encryption enable field is set for the output data, the USB controller may read an encryption key field of the portion of the data structure to determine an encryption key corresponding to the output data. The USB controller may then use the encryption key to decrypt the output data at a decryption unit of the USB controller.

This process flow diagram of FIG. 8 is not intended to indicate that the blocks of the method 800 are to be executed in any particular order, or that all of the blocks are to be included in every case. Further, any number of additional blocks not shown in FIG. 8 may be included within the method 800, depending on the details of the specific implementation. For example, the USB controller may send the output data directly to the USB device if the USB controller determines that the output data is not encrypted. In addition, in some examples, the method 800 may be performed for output data received from a number of different applications running on the computing device, and such output data may be sent to a number of different USB devices.

Figure 9:
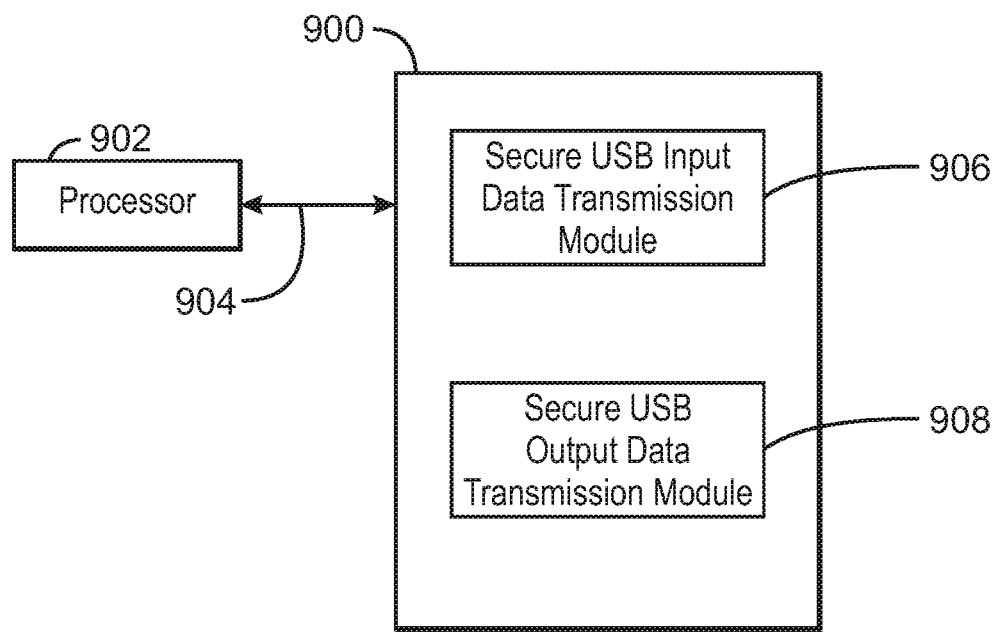
FIG. 9 is a block diagram showing computer-readable media that store code for providing secure data transmission over a USB interface.

FIG. 9 is a block diagram showing computer-readable media 900 that store code for providing secure data transmission over a USB interface. The computer-readable media 900 may be accessed by a processor 902 over a computer bus 904. Furthermore, the computer-readable medium 900 may include code configured to direct the processor 902 to perform the methods described herein. In some embodiments, the computer-readable media 900 may be non-transitory computer-readable media. In some examples, the computer-readable media 900 may be storage media. However, in any case, the computer-readable media 900 do not include transitory media such as carrier waves, signals, and the like.

The various software components discussed herein may be stored on one or more computer-readable media 900, as indicated in FIG. 9. For example, a secure USB input data transmission module 906 may be configured to receive input data from a USB device and encrypt the input data at a USB controller before transmitting the input data to a secure application. This may be accomplished using an encryption unit of the USB controller and an encryption key obtained from an input endpoint data structure. In addition, a secure USB output data transmission module 908 may be configured to receive encrypted output data from the secure application and decrypt the output data at the USB controller before transmitting the output data to the USB device. This may be accomplished using a decryption unit of the USB controller and an encryption key obtained from an output endpoint data structure.

The block diagram of FIG. 9 is not intended to indicate that the computer-readable media 900 is to include all of the components shown in FIG. 9. Further, the computer-readable media 900 may include any number of additional components not shown in FIG. 9, depending on the details of the specific implementation.

It is to be noted that, while FIGS. 1-9 describe the present techniques as relating to USB devices, the present techniques may also be used to transfer data between a host computing device and any other suitable type of peripheral computing device. Thus, the USB controller may be more generally described as a "controller," and the "USB" device may be more generally described as a "peripheral computing device."

Figure 10:
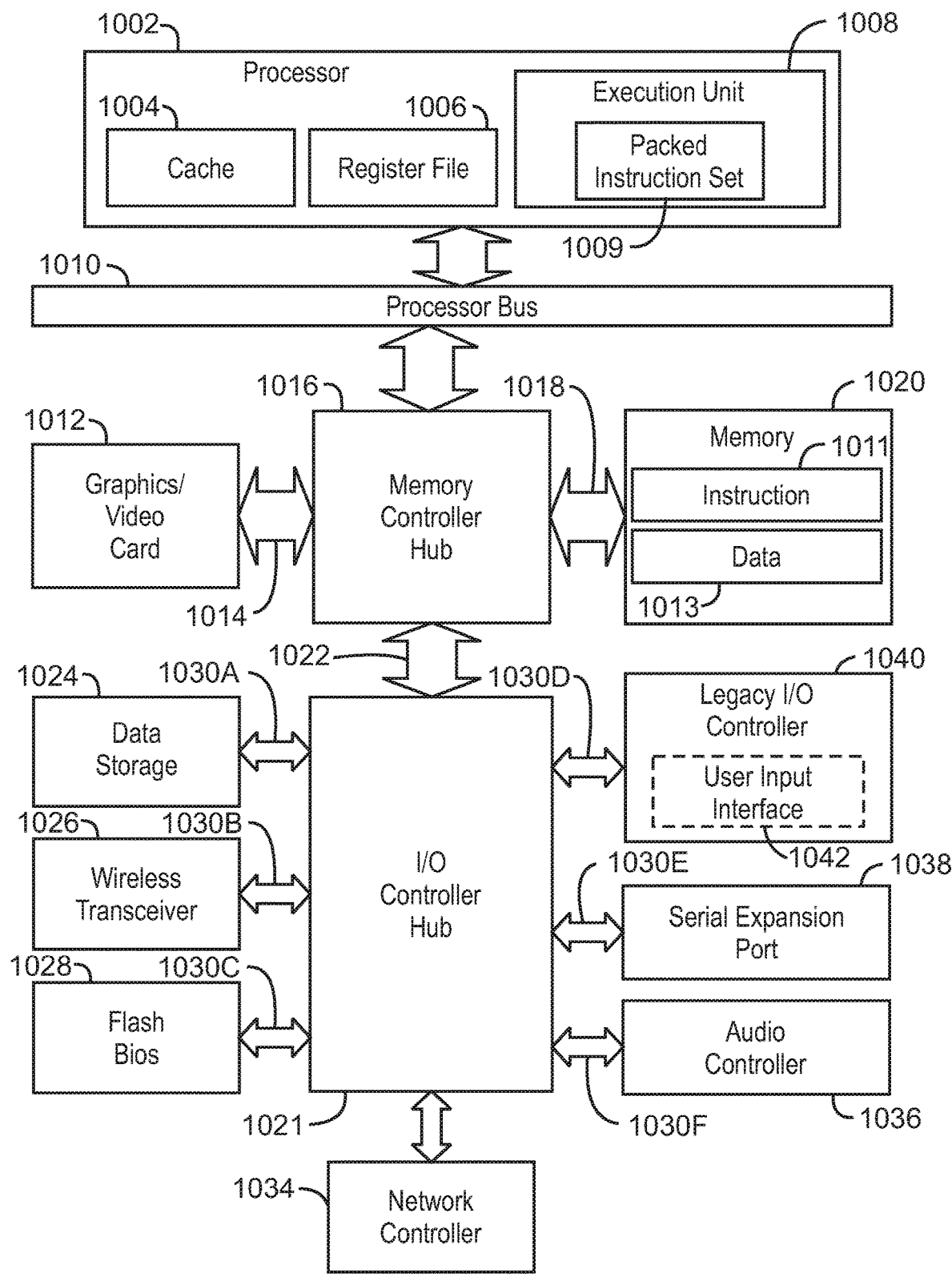
FIG. 10 is a block diagram of a computing system that may be used according to various examples described herein.

FIG. 10 is a block diagram of a computing system that may be used according to various examples described herein. More specifically, FIG. 10 is a block diagram of an exemplary computing system formed with a processor that includes execution units to execute an instruction, where one or more of the interconnects implement one or more features in accordance with one embodiment of the present invention. System 1000 includes a component, such as a processor 1002 to employ execution units including logic to perform algorithms for process data, in accordance with the present invention, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a "hub" system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g., graphics/video card 1012, memory controller hub 1016, memory 1020, I/O controller hub 1021, data storage 1024, wireless transceiver 1026, flash BIOS 1028, network controller 1034, audio controller 1036, serial expansion port 1038, legacy I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions 1011 and/or data 1013 represented by data signals that are to be executed by the processor 1002.

Note that any of the aforementioned features or aspects of the invention may be utilized on one or more interconnect illustrated in FIG. 10. For example, an on-die interconnect (ODI), which is not shown, for coupling internal units of processor 1002 implements one or more aspects of the invention described above. Or the invention is associated with a processor bus 1010 (e.g. Intel Quick Path Interconnect (QPI) or other known high performance computing interconnect), a high bandwidth memory path 1018 to memory 1020, a point-to-point link to graphics/video card 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1040 containing user input and keyboard interfaces 1042, a serial expansion port 1038 such as Universal Serial Bus (USB), and a network controller 1034. The data storage device 1024 can include a hard disk drive, a floppy disk drive, a CD-ROM device, a flash memory device, or other mass storage device.

Examples

Example 1 is a computing device. The computing device includes a controller configured to communicably couple the computing device to a peripheral computing device. The controller includes an encryption unit configured to encrypt input data received from the peripheral computing device before sending the input data to an application running on the computing device, and a decryption unit configured to decrypt output data received from the application before sending the output data to the peripheral computing device. The computing device also includes a memory device including a data structure that directs the flow of the input data and the output data between the peripheral computing device and the application. The data structure includes an encryption enable field and an encryption key field for controlling the encryption unit and the decryption unit of the controller.

Example 2 includes the computing device of example 1, including or excluding optional features. In this example, the controller accesses the data structure within the memory device and uses information from the data structure to control the encryption unit and the decryption unit.

Example 3 includes the computing device of example 2, including or excluding optional features. In this example, the controller accesses a portion of the data structure corresponding to an input endpoint for the input data before determining whether to encrypt the input data using the encryption unit.

Example 4 includes the computing device of example 2, including or excluding optional features. In this example, the controller accesses a portion of the data structure corresponding to an output endpoint for the output data before determining whether to decrypt the output data using the decryption unit.

Example 5 includes the computing device of any one of examples 1 to 4, including or excluding optional features. In this example, the controller is configured to communicably couple the computing device to a number of peripheral computing devices.

Example 6 includes the computing device of example 5, including or excluding optional features. In this example, the encryption unit is configured to encrypt input data received from any of the number of peripheral computing devices before sending the input data to any of a number of applications running on the computing device.

Example 7 includes the computing device of example 5, including or excluding optional features. In this example, the decryption unit is configured to decrypt output data received from any of a number of applications before sending the output data to any of the number of peripheral computing devices.

Example 8 includes the computing device of any one of examples 1 to 7, including or excluding optional features. In this example, the encryption enable field of the data structure indicates whether the encryption unit is to be enabled for the input data.

Example 9 includes the computing device of example 8, including or excluding optional features. In this example, the encryption key field includes an encryption key to be used to encrypt the input data if the encryption enable field indicates that the encryption unit is to be enabled for the input data.

Example 10 includes the computing device of any one of examples 1 to 9, including or excluding optional features. In this example, the encryption enable field of the data structure indicates whether the decryption unit is to be enabled for the output data.

Example 11 includes the computing device of example 10, including or excluding optional features. In this example, the encryption key field includes an encryption key to be used to decrypt the output data if the encryption enable field indicates that the decryption unit is to be enabled for the output data.

Example 12 includes the computing device of any one of examples 1 to 11, including or excluding optional features. In this example, the computing device runs the application in a higher virtual trust level than other software running on the computing device.

Example 13 includes the computing device of any one of examples 1 to 12, including or excluding optional features. In this example, the application is configured to decrypt the input data after the application receives the input data.

Example 14 includes the computing device of any one of examples 1 to 13, including or excluding optional features. In this example, the application is configured to encrypt the output data before sending the output data to the controller.

Example 15 includes the computing device of any one of examples 1 to 14, including or excluding optional features. In this example, the controller is a USB controller, and the peripheral computing device is a USB device.

Example 16 is a method for securely transmitting input data between a computing device and a peripheral computing device. The method includes receiving, at a controller of a computing device, input data from a peripheral computing device, and detecting whether an encryption feature of the controller is enabled. The method also includes, if the encryption feature is enabled, encrypting the input data before sending the input data to an application running on the computing device.

Example 17 includes the method of example 16, including or excluding optional features. In this example, the method further includes, if the encryption feature is not enabled, sending the input data to the application.

Example 18 includes the method of any one of examples 16 to 17, including or excluding optional features. In this example, detecting whether an encryption feature of the controller is enabled includes accessing a portion of a data structure corresponding to an input endpoint for the input data, and determining whether an encryption enable field of the portion of the data structure is set for the input data.

Example 19 includes the method of example 18, including or excluding optional features. In this example, encrypting the input data includes, if the encryption enable field is set for the input data, reading an encryption key field of the portion of the data structure to determine an encryption key corresponding to the input data. Encrypting the input data also includes using the encryption key to encrypt the input data at an encryption unit of the controller.

Example 20 includes the method of any one of examples 16 to 19, including or excluding optional features. In this example, the method further includes receiving, at the controller, input data from a number of peripheral computing devices, and detecting whether an encryption feature of the controller is enabled for the input data received from each of the number of peripheral computing devices. The method also includes, if the encryption feature is enabled for input data received from any of the number of peripheral computing devices, encrypting the input data before sending the input data to any of a number of applications running on the computing device.

Example 21 includes the method of any one of examples 16 to 20, including or excluding optional features. In this example, the controller is a USB controller, and the peripheral computing device is a USB device.

Example 22 is a method for securely transmitting output data between a computing device and a peripheral computing device. The method includes receiving, at a controller of a computing device, output data from an application running on the computing device, and detecting whether the output data is encrypted. The method also includes, if the output data is encrypted, decrypting the output data before sending the output data to a peripheral computing device.

Example 23 includes the method of example 22, including or excluding optional features. In this example, the method further includes, if the output data is not encrypted, sending the output data to the peripheral computing device.

Example 24 includes the method of any one of examples 22 to 23, including or excluding optional features. In this example, detecting whether the output data is encrypted includes accessing a portion of a data structure corresponding to an output endpoint for the output data, and determining whether an encryption enable field of the portion of the data structure is set for the output data.

Example 25 includes the method of example 24, including or excluding optional features. In this example, decrypting the output data includes, if the encryption enable field is set for the output data, reading an encryption key field of the portion of the data structure to determine an encryption key corresponding to the output data. Decrypting the output data also includes using the encryption key to decrypt the output data at a decryption unit of the controller.

Example 26 includes the method of any one of examples 22 to 25, including or excluding optional features. In this example, the method further includes receiving, at the controller, output data from a number of applications running on the computing device, and detecting whether the output data received from any of the number of applications is encrypted. The method also includes, if the output data received from any of the number of applications is encrypted, decrypting the output data before sending the output data to any of a number of peripheral computing devices.

Example 27 includes the method of any one of examples 22 to 26, including or excluding optional features. In this example, the controller is a USB controller, and the peripheral computing device is a USB device.

Example 28 is a tangible, non-transitory, computer-readable medium. The computer-readable medium includes instructions that, when executed by a processor, direct the processor to securely transmit input data by receiving the input data from a peripheral computing device and encrypting the input data at a controller before transmitting the input data to an application. The computer-readable medium also includes instructions that, when executed by a processor, direct the processor to securely transmit output data by receiving the output data from the application and decrypting the output data at the controller before transmitting the output data to the peripheral computing device.

Example 29 includes the computer-readable medium of example 28, including or excluding optional features. In this example, the computer-readable medium includes instructions that direct the processor to encrypt the input data using an encryption unit of the controller and an encryption key obtained from an endpoint data structure.

Example 30 includes the computer-readable medium of any one of examples 28 to 29, including or excluding optional features. In this example, the computer-readable medium includes instructions that direct the processor to decrypt the output data using a decryption unit of the controller and an encryption key obtained from an endpoint data structure.

Example 31 includes the computer-readable medium of any one of examples 28 to 30, including or excluding optional features. In this example, the computer-readable medium includes instructions that direct the processor to run the application in a higher virtual trust level than other applications.

Example 32 includes the computer-readable medium of any one of examples 28 to 31, including or excluding optional features. In this example, the controller is a USB controller, and the peripheral computing device is a USB device.

Example 33 is an apparatus for securely transmitting data between a computing device and a peripheral computing device. The apparatus includes a means for securely transmit input data by receiving the input data from a peripheral computing device and encrypting the input data before transmitting the input data to an application. The apparatus also includes a means for securely transmit output data by receiving the output data from the application and decrypting the output data before transmitting the output data to the peripheral computing device.

Example 34 includes the apparatus of example 33, including or excluding optional features. In this example, the peripheral computing device is a USB device.

Example 35 includes a machine-readable medium including code that, when executed, causes a machine to perform the method of any one of examples 16 to 21.

Example 36 includes a machine-readable medium including code that, when executed, causes a machine to perform the method of any one of examples 22 to 27.

Example 37 includes an apparatus. The apparatus includes a means to perform a method as described in any preceding example.

Example 38 includes machine-readable storage. The machine-readable storage includes machine-readable instructions that, when executed, implement a method or realize a computing device as described in any preceding example.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device, comprising:
   a controller configured to communicably couple the computing device to a peripheral computing device, wherein the controller comprises:
   an encryption unit on the computer device configured to encrypt input data received from the peripheral computing device before sending the input data to an application running on the computing device wherein the computing device runs the application in a higher virtual trust level than other software running on the computing device; and
   a decryption unit on the computer device configured to decrypt output data received from the application running on the computing device before sending the output data to the peripheral computing device; and
   a memory device comprising a data structure that directs a flow of the input data and the output data between the peripheral computing device and the application, wherein the data structure comprises an encryption enable field and an encryption key field for controlling the encryption unit and the decryption unit of the controller, wherein the encryption enable field of the data structure indicates whether the encryption unit is to be enabled for the input data, and wherein the encryption key field comprises an encryption key to be used to encrypt the input data in response to the encryption enable field indicating that the encryption unit is to be enabled for the input data.

2. The computing device of claim 1, wherein the controller accesses the data structure within the memory device and uses information from the data structure to control the encryption unit and the decryption unit.

3. The computing device of claim 2, wherein the controller accesses a portion of the data structure corresponding to an input endpoint for the input data before determining whether to encrypt the input data using the encryption unit.

4. The computing device of claim 2, wherein the controller accesses a portion of the data structure corresponding to an output endpoint for the output data before determining whether to decrypt the output data using the decryption unit.

5. The computing device of claim 1, wherein the controller is configured to communicably couple the computing device to a plurality of peripheral computing devices.

6. The computing device of claim 5, wherein the encryption unit is configured to encrypt the input data received from any of the plurality of peripheral computing devices before sending the input data to any of a plurality of applications running on the computing device.

7. The computing device of claim 5, wherein the decryption unit is configured to decrypt the output data received from any of a plurality of applications before sending the output data to any of the plurality of peripheral computing devices.

8. The computing device of claim 1, wherein the controller comprises a USB controller, and wherein the peripheral computing device comprises a USB device.

9. A method for securely transmitting input data between a computing device and a peripheral computing device, comprising:
   encrypting input data with an encryption unit on the computer device, the input data received from a peripheral computing device communicably coupled to the computing device with a controller, wherein the encrypting occurs before sending the input data from the peripheral computing device to an application running on the computing device wherein the computing device runs the application in a higher virtual trust level than other software running on the computing device; and
   decrypting output data with a decryption unit on the computer device, wherein the decryption of is of output data received from the application running on the computing device before sending the output data to the peripheral computing device; and
   directing, with a memory device comprising a data structure, a flow of the input data and the output data between the peripheral computing device and the application, wherein the data structure comprises an encryption enable field and an encryption key field for controlling the encryption unit and the decryption unit of the controller, wherein the encryption enable field of the data structure indicates whether the encryption unit is to be enabled for the input data, and wherein the encryption key field comprises an encryption key to be used to encrypt the input data in response to the encryption enable field indicating that the encryption unit is to be enabled for the input data.

10. The method of claim 9, further comprising, in response to a detection that an encryption feature is not enabled, sending the input data to the application.

11. The method of claim 9, wherein detecting whether an encryption feature of the controller is enabled comprises:
    accessing a portion of a data structure corresponding to an input endpoint for the input data; and
    determining whether the encryption enable field of the portion of the data structure is set for the input data.

12. The method of claim 11, wherein encrypting the input data comprises:
    in response to setting the encryption enable field for the input data, reading an encryption key field of the portion of the data structure to determine the encryption key corresponding to the input data; and
    using the encryption key to encrypt the input data at the encryption unit of the controller.

13. The method of claim 9, further comprising:
    receiving, at the controller, the input data from a plurality of peripheral computing devices;
    detecting whether the encryption feature of the controller is enabled for the input data received from each of the plurality of peripheral computing devices; and
    in response to enabling the encryption feature for the input data received from any of the plurality of peripheral computing devices, encrypting the input data before sending the input data to any of a plurality of applications running on the computing device.

14. A tangible, non-transitory, computer-readable medium comprising instructions that, when executed by a processor, direct the processor to:
   encrypt input data with an encryption unit, the input data received from a peripheral computing device communicably coupled to the computer-readable medium with a controller, wherein the encrypting occurs before sending the input data from the peripheral computing device to an application running on the computer-readable medium wherein the computer-readable medium directs the processor to run the application in a higher virtual trust level than other software running on the by the instructions of the computer-readable medium; and
   decrypt output data with a decryption unit on the computer-readable medium, wherein the decryption of is of output data received from the application running on the computer-readable medium before sending the output data to the peripheral computing device; and
   direct, with a memory device comprising a data structure, the flow of the input data and the output data between the peripheral computing device and the application, wherein the data structure comprises an encryption enable field and an encryption key field for controlling the encryption unit and the decryption unit of the controller, wherein the encryption enable field of the data structure indicates whether the encryption unit is to be enabled for the input data, and wherein the encryption key field comprises an encryption key to be used to encrypt the input data in response to the encryption enable field indicating that the encryption unit is to be enabled for the input data.

15. The tangible, non-transitory, computer-readable medium of claim 14, wherein the tangible, non-transitory, computer-readable medium comprises instructions that direct the processor to encrypt the input data using the encryption unit of the controller and an encryption key obtained from an endpoint data structure.

16. The tangible, non-transitory, computer-readable medium of claim 14, wherein the tangible, non-transitory, computer-readable medium comprises instructions that direct the processor to decrypt the output data using the decryption unit of the controller and the encryption key obtained from an endpoint data structure.

17. The tangible, non-transitory, computer-readable medium of claim 14, wherein the controller comprises a USB controller, and wherein the peripheral computing device comprises a USB device.

* * * * *